United States Patent [19]
Zortea

[11] Patent Number: 5,548,697
[45] Date of Patent: Aug. 20, 1996

[54] NON-LINEAR COLOR CORRECTOR HAVING A NEURAL NETWORK AND USING FUZZY MEMBERSHIP VALUES TO CORRECT COLOR AND A METHOD THEREOF

[75] Inventor: Anthony E. Zortea, Pipersville, Pa.

[73] Assignee: Panasonic Technologies, Inc., Princeton, N.J.

[21] Appl. No.: 367,798

[22] Filed: Dec. 30, 1994

[51] Int. Cl.[6] .......................... G06E 1/00; G05B 13/00; H04N 9/64; G03F 3/08
[52] U.S. Cl. .................. 395/22; 395/3; 395/61; 382/159; 382/167; 382/165; 358/518; 348/650
[58] Field of Search .................... 395/22, 61, 3; 348/650; 358/518; 382/159, 167, 165

[56] References Cited

U.S. PATENT DOCUMENTS

| | | | |
|---|---|---|---|
| 5,162,899 | 11/1992 | Naka et al. | 358/80 |
| 5,185,850 | 2/1993 | Usui et al. | 395/22 |
| 5,255,344 | 10/1993 | Takagi et al. | 395/3 |
| 5,285,297 | 2/1994 | Rose et al. | 358/518 |
| 5,289,295 | 2/1994 | Yumiba et al. | 358/518 |
| 5,339,365 | 8/1994 | Kawai et al. | 382/54 |
| 5,386,496 | 2/1995 | Arai et al. | 395/22 |
| 5,425,108 | 6/1995 | Hwang et al. | 382/105 |
| 5,434,927 | 7/1995 | Brady et al. | 382/104 |
| 5,444,796 | 8/1995 | Ornstein | 382/157 |

OTHER PUBLICATIONS

T. Masters, "Practical Neural Network Recipes in C++", San Diego, Academic Press, Inc. (1993), Chapters 6, 8, 17 & 18, and pp. 21, 22, 409 & 411.

P. Wasserman, "Advanced Methods in Neural Computing", published by New York Van Nostrand Reinhold (1993).

*Primary Examiner*—Raymond J. Bayerl
*Assistant Examiner*—A. Katbab
*Attorney, Agent, or Firm*—Ratner & Prestia

[57] ABSTRACT

A color corrector for changing pixels in an image where the color corrector includes a neural fuzzy classifier to generate a membership value which defines a degree of membership of each pixel in a group of pixels to be transformed. A pixel color changer is also provided to transform the pixel according to its membership in the group of pixels to be changed. The color corrector can also include a pixel group classifier for identifying groups of pixels in the image to train the neural fuzzy classifier to generate the membership value.

13 Claims, 9 Drawing Sheets

5,548,697

NON-LINEAR COLOR CORRECTOR HAVING A NEURAL NETWORK AND USING FUZZY MEMBERSHIP VALUES TO CORRECT COLOR AND A METHOD THEREOF

BACKGROUND OF THE INVENTION

The present invention relates to a non-linear color corrector and more particularly, to a non-linear color corrector which includes a neural network for defining the class of colors to be changed.

There are many possible technical problems in image reproduction, including the effects caused by lighting and non-ideal image sensing, and transmission and display of the image. Non-linear processes can occur at any one of these steps to corrupt the color fidelity of the image.

For example, problems may arise in the video camera used to sense an image. A video camera is made up of three separate channels, usually identified as the red, green, and blue primaries. The required spectral sensitivity of the three camera primaries can be derived using the chromaticities, a physical measurement related to spectral content, of the display device's three primaries. The camera primaries are related to the spectral sensitivity of the prism that separates the light into three channels. Color reproduction fidelity suffers to the extent the camera primaries do not match the three primaries of the display.

There is also the possibility of introducing a simple linear transformation into the three primaries, sometimes necessary when changing from one set of display primaries to another. Linear transformations are also used when it is necessary to increase the saturation of colors, or to change the brightness.

In addition to technical reproduction of an image, psychological processing of an image by a viewer effectively makes a reproduced image appear different than if the viewer were present at the scene. These effects include brightness and color adaptation. Adaptation is the tendency of the eye to adjust itself to the spectral distribution of the average illumination over the entire field of view. Thus, someone who perceives an original scene with a particular average spectral illumination would perceive the scene differently on a smaller display in a setting with a different average illumination.

In addition to the above technical problems of reproducing and displaying an image, it may be desirable to perform artistic color correction of an image. A person may simply desire to change the color content of an image for purely artistic reasons. For example, a specific class of colors in an image may be changed to a different color for purely artistic reasons. These types of corrections are non-linear transformations of a specific class of colors.

Non-linear color correction involves several steps including: (1) defining a class of colors that need to be changed (hereinafter referred to as the "change-class"), (2) defining how a pixel belonging to that class is to be changed, (3) examining each pixel and determining the extent to which it belongs to the change-class, and (4) changing each pixel according to its membership in the change-class.

The change-class can be defined by user examples. For example, the user can examine the image and generate a list of pixels that should undergo significant change, should undergo little change, or should not be changed. In addition, the user can also control how the pixels should be changed. This is a simple, model-free method of acquiring the necessary information from the user.

FIG. 1 illustrates the difficulties which may be encountered in defining the change-class using a model-free class membership definition. FIG. 1 is a graph showing a mapping of color components in a two-dimensional color image into two color components. In FIG. 1 the user's change-class is not a simple shape like an ellipse or a rectangle. As a result, it is difficult to model the shape of this class. The difficulty increases in three dimensions (i.e., when a third color component is used in the mapping operation).

The pixels in the change-class are changed once the membership in the change-class is determined. The pixels can be changed using both modelled and model-free methods.

FIG. 2 illustrates the modelled method for changing a pixel. In FIG. 2, the pixels having color combinations near pixel p1, for example pixel p3, are changed towards pixel p2 to either, for example, pixels pa or pb, having color combinations near pixel p2. A color corrector examines pixel p3, determines if it belongs to the change-class, and provides a membership value c designating the pixels membership in the change-class. The pixel p3 can be changed towards p2 to pixel pa by an amount proportional to the membership value c in the direction of vector A according to equation (1) below.

$$pa = p3 + c*A \tag{1}$$

Alternatively, pixel p3 can be changed in the same direction as the vector V to color combination pb according to equation (2) below.

$$pb = p3 + c*V \tag{2}$$

As shown in FIG. 2, the vector B=c*V.

Equations (1) and (2) essentially move a pixel along a vector by an amount proportional to its membership value c in the pixel change-class. Equation (1) moves the pixel towards the "target" pixel and equation (2) moves the pixel in the same direction as the original vector. Equation (2) maintains color resolution near the colors that will be changed by remapping pixels in the same direction. Equation (1) allows a relatively larger color-volume of pixels to be mapped to a smaller color-volume, thus, decreasing color resolution.

The implementation of either equation (1) or (2) for remapping the pixels in the change class, however, requires that the pixels in the change class be defined. Defining the change class is a difficult task requiring extensive user involvement. Defining the change class is even more difficult where, as shown in FIG. 1, the change class is not a simple shape. The class of colors to be changed can be somewhat arbitrary, fuzzy, and complex. Furthermore, some non-linear color correctors are difficult to use, requiring the user to have extensive knowledge of colorimetry principles. Thus, it would be advantageous if the user could define the class by example without identifying large number of pixels.

Accordingly, an apparatus and method are needed to define the change-class and to remap the pixels in the change-class.

SUMMARY OF THE INVENTION

The present invention provides a color corrector for changing pixels in an image. The color corrector has a neural fuzzy classifier which generates a membership value that defines the degree of membership of the pixel in a group of pixels to be transformed. A pixel color changer is also provided which transforms the pixel according to its membership in the group of pixels to be changed. The present invention also relates to a pixel group classifier which identifies groups of pixels to train the neural fuzzy classifier to generate the membership value.

BRIEF DESCRIPTION OF THE DRAWING

The invention is best understood from the following detailed description when read in connection with the accompanying drawings, in which.

DETAILED DESCRIPTION OF THE INVENTION

The exemplary embodiment of the present invention includes a pixel fuzzy classifier and a pixel color changer. The pixel fuzzy classifier determines the fuzzy membership of each pixel in the class of colors to be changed. Once the fuzzy membership of the class of colors to be changed is determined, the pixel fuzzy classifier provides a control signal to the pixel color changer which changes each pixel according to the fuzzy membership of the pixel in the change-class. Pixels close to the change class in color composition are changed according to the fuzzy membership of those pixels in the change-class. As a result, a smooth transition between the change class pixels and the pixels surrounding the change-class can be obtained.

Figure 3:
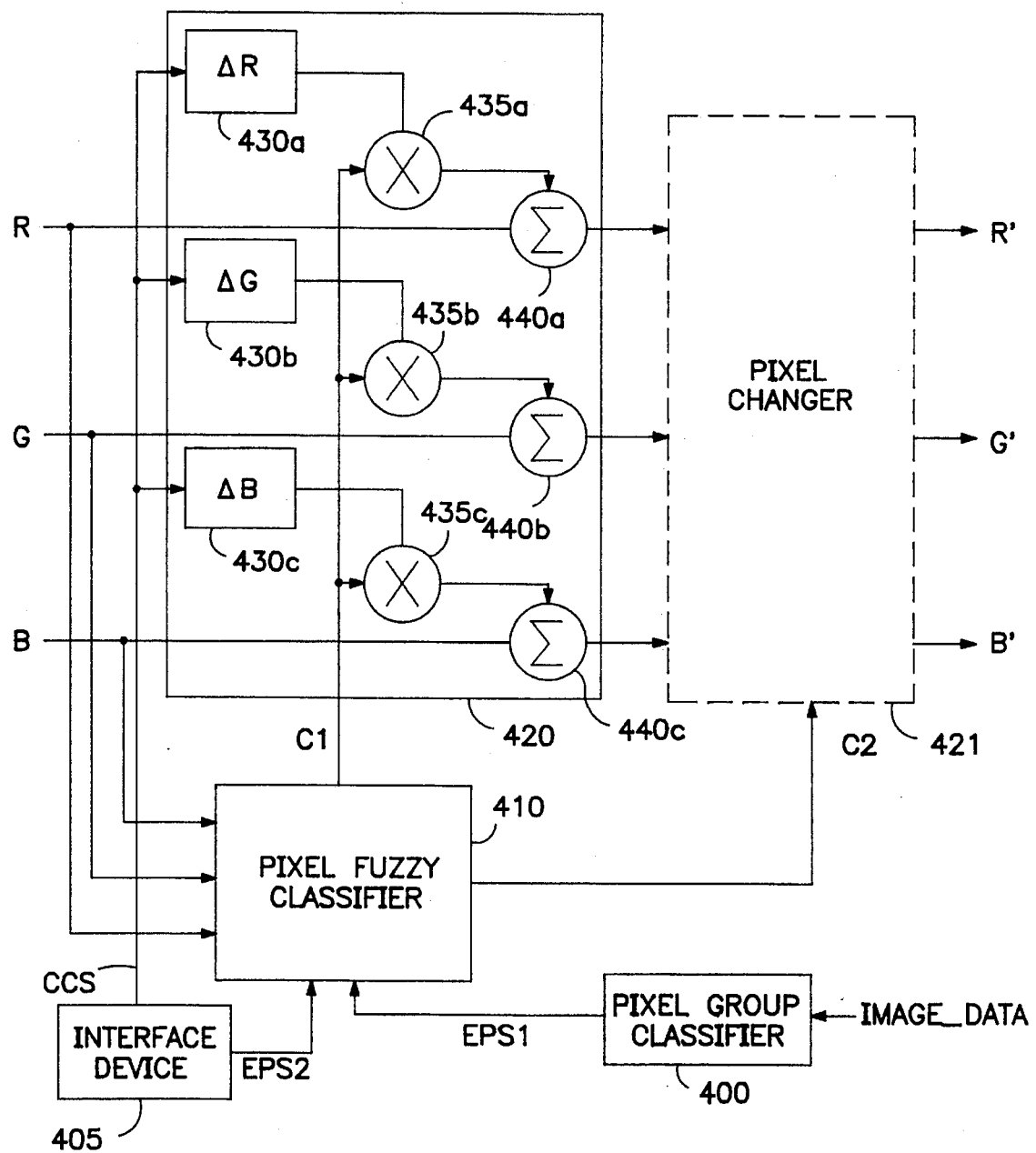
FIG. 3 is a block diagram of the color corrector according to an exemplary embodiment of the present invention.

FIG. 3 is an exemplary embodiment of the color corrector according to the present invention. The color corrector includes a pixel fuzzy classifier 410 which determines the fuzzy membership of a pixel in the change-class. The exemplary pixel fuzzy classifier includes a neural network. A fuzzy membership value signal c1 of a pixel in the change-class is provided to pixel color changer 420. Pixel color changer 420 changes the pixels using either equation (1) or (2) and fuzzy membership value signal. Pixel changer 420 is a non-neural processor.

In the color changer 420, vectors A or V of equations (1) and (2) are separated into three components $\Delta R$, $\Delta G$ and $\Delta B$ which are separately multiplied by the fuzzy membership value and respectively added to the R, G, and B components of the pixel to be color corrected. Vectors A or V are provided through interface device 405 in color change signal CCS to memory units 430a, 430b, and 430c. Memory units 430 provided the components $\Delta R$, $\Delta G$ and $\Delta B$ to respective multipliers 435a, 435b, and 435c which provided outputs to respective adders 440a, 440b, and 440c.

A second pixel changer 421 can be included for changing a second change-class of colors. The pixel fuzzy classifier 410 provides a second membership value c2 for the pixel providing the pixels fuzzy membership in the second change-class. The second pixel changer 421 changes the pixel using either equation (1) or (2) and fuzzy membership value c2. The components of a second vector A or V in equations (1) and (2), respectively, are multiplied by the fuzzy membership value c2 and then added to the color corrected pixel from the first pixel changer 420. In addition, further pixel changers can be provided for additional change-classes.

The pixel fuzzy classifier 410 is trained by example to produce fuzzy membership value c for the different pixels in an image. A neural network essentially performs a process called vector mapping where it maps a set of input values to a set of output values as shown in FIG. 4a.

Figure 1:
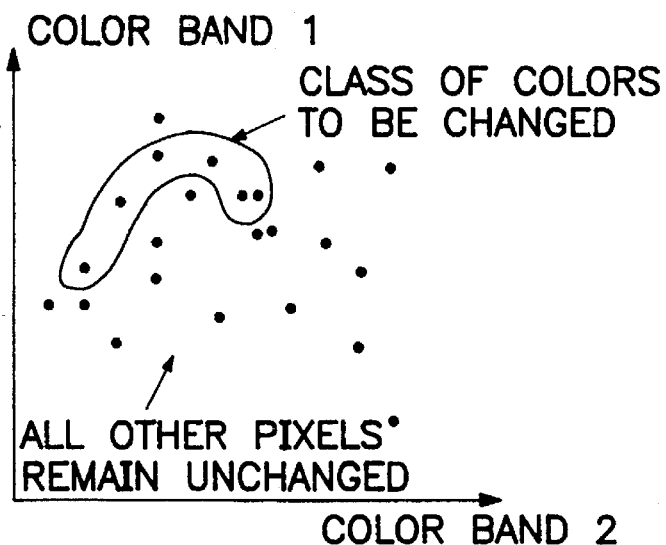
FIG. 1 is a graph of pixels in an image with respect to two different color bands.
Figure 2:
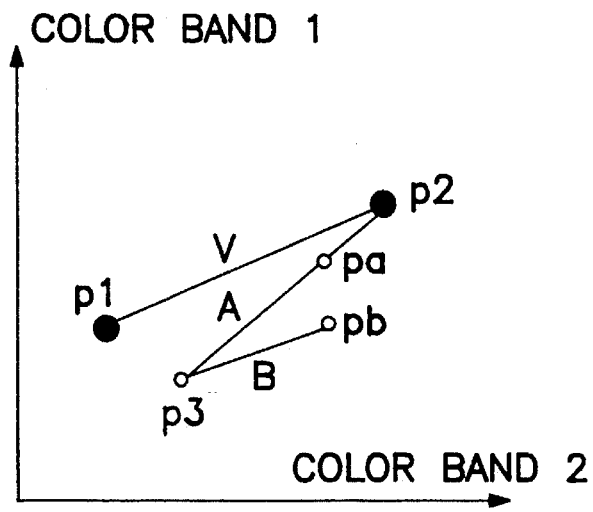
FIG. 2 is a graph of a two-dimensional color plane illustrating the prior art modelled method for changing a pixel.
Figure 4A:
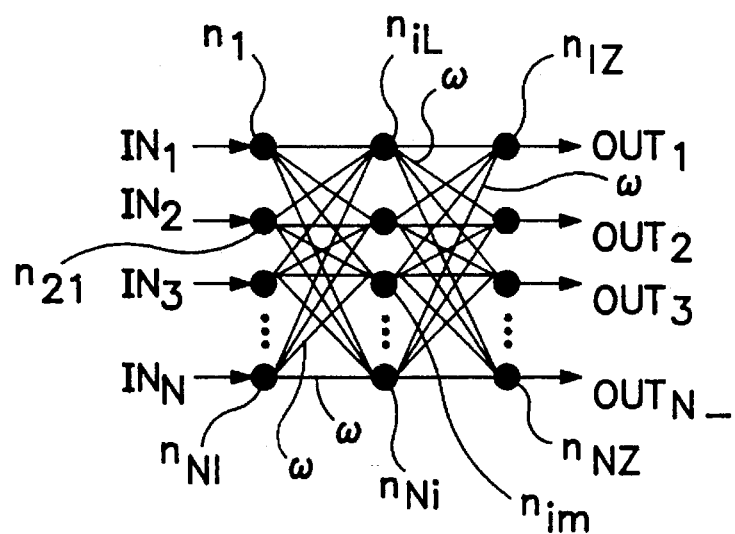
FIG. 4a is a block diagram illustrating a conventional feed-forward neural network.

FIG. 4a illustrates a conventional feed-forward neural network where the weights, w, scale the inputs to the nodes, or neurons, n. Signals are provided to terminals IN An output signal $V_i^m$, not shown produced at node $n_{i_m}$ at layer m, is determined by equations (3) and (4) below.

$$V_i^m = g[h_i^m] = g\left[\sum_{j=1}^{V_{m-1}} w_{ij}^m \cdot V_j^{m-1} - w_{i0}\right] \quad (3)$$

$$g\beta(x) = 1/(1+e^{-\beta x}) \quad (4)$$

where $w_{ij}^m$ is the strength of the connection from node $V_j^{m-1}$ to $V_i^m$, $w_{i0}$ is the bias of the node, and $N_m$ is the number of nodes in the $m^{th}$ layer. Each node can be viewed as computing a weighted sum of the inputs from the nodes of the preceding layer, then passing the sum through a "squashing function" $g\beta(x)$. *Advanced Methods in Neural Computing* by Wasserman, Philip D., published by New York Van Nostrand Reinhold, discusses the feed-forward neural network and is incorporated by reference for its teachings on feed-forward neural networks.

Figure 4B:
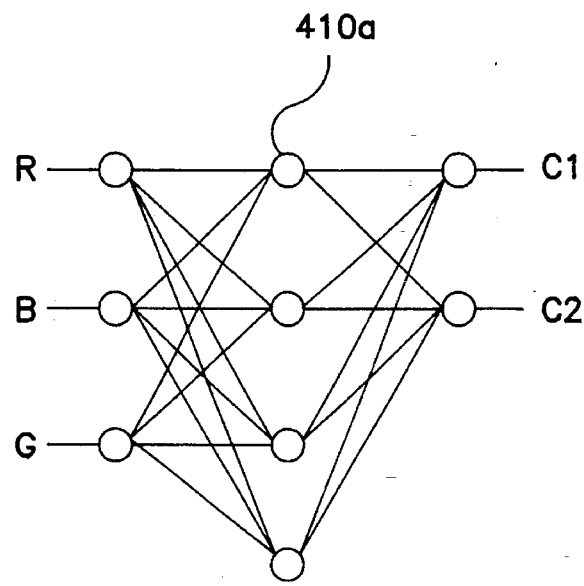
FIG. 4b is a block diagram illustrating a neural network in the pixel fuzzy classifier 410 shown in FIG. 3 according to an exemplary embodiment of the present invention.

An exemplary embodiment of the neural network 410a in pixel fuzzy classifier 410 is shown in FIG. 4b in block form. The neural network is provided pixels comprising one or more pixel data values R, B, and G for the three primary colors red, blue, and green. The output signal of the neural network is fuzzy membership values c1 and c2. Fuzzy membership values c1 and c2 range from zero to one where zero represents no membership in the change-class and one corresponds to full membership in the change class.

If only one change-class is identified, then only one fuzzy membership value is produced by the neural network 410a. In this case, for example, the fuzzy membership value for the pixel applied to the neural network is the value c1. If two change-classes are identified by the neural network, then the membership of the pixel in the first change-class is fuzzy membership value c1 and the membership of the pixel in the second change class is fuzzy membership value c2.

Although only two fuzzy membership values are shown in FIG. 4b for two different change classes, any number of fuzzy membership values can be produced corresponding to any number of change-classes. For each additional change-class an additional output node is provided in the neural network.

Figure 6A:
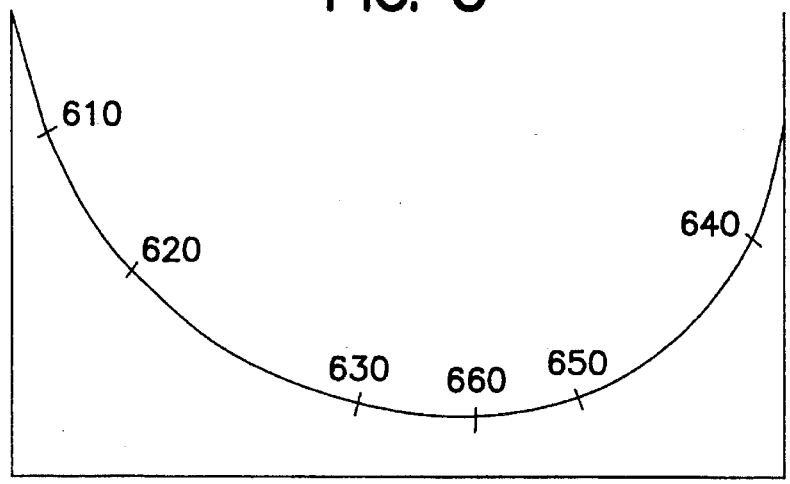
FIG. 6a is a graph illustrating training step 530 shown in FIG. 6.
Figure 6:
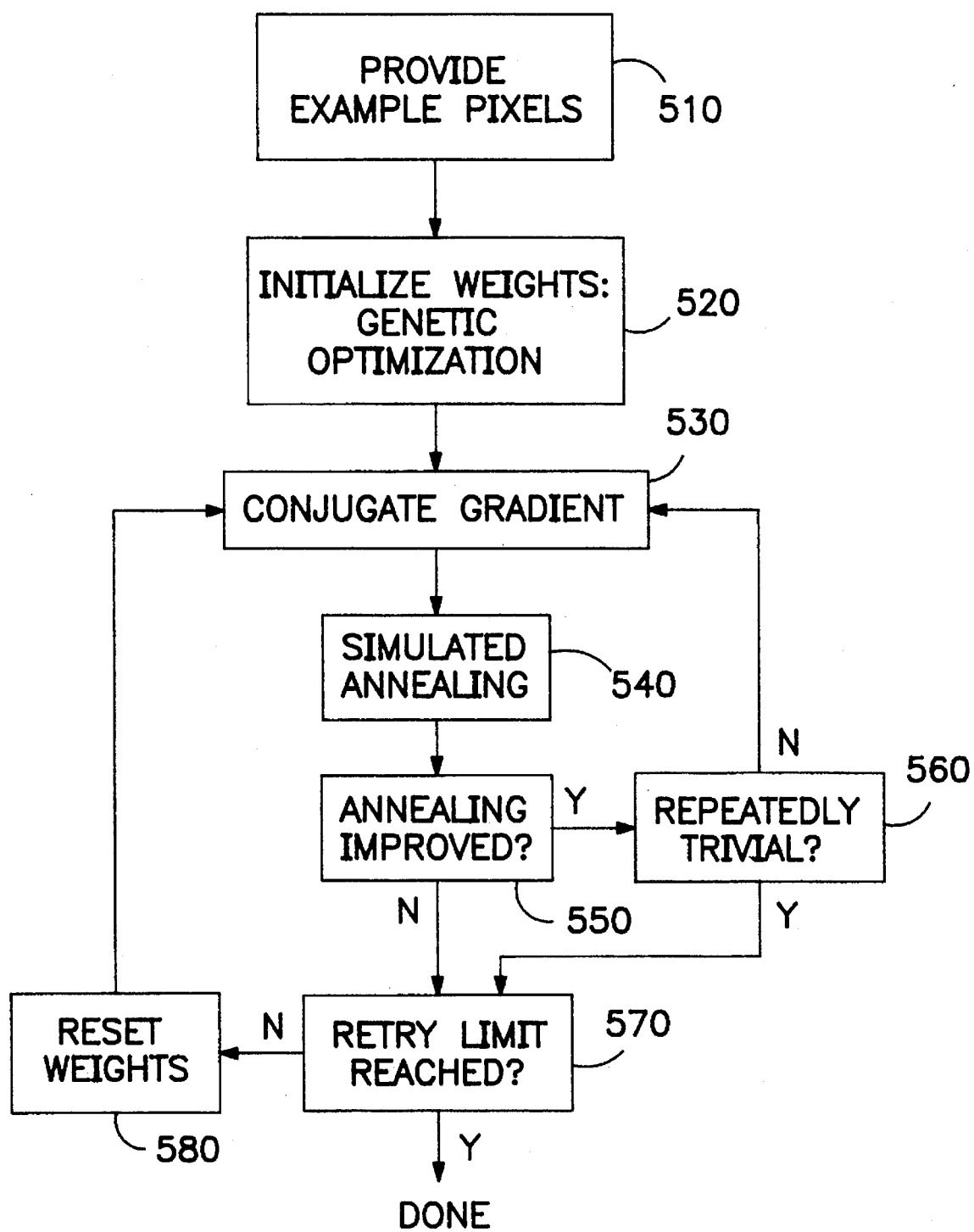
FIG. 6 is a flow chart diagram of a training method for training the fuzzy neural classifier shown in FIG. 3.

The strength of the connections between the nodes $W_i^m$, as well as the bias of the nodes $W_{io}$ are generated using the flow chart shown in FIG. 6. The neural network "learns" by a process experience arising from exposure to measurements of empirical phenomena which are converted to empirical rules that are embodied in network weights. With reference to FIG. 4, the pixels for training the pixel fuzzy classifier 410 are provided by a user through interface device 405 in example pixel signal EPS1 or by pixel group classifier 400 in example pixel signal EPS2. Pixel group classifier contains a second neural network for identifying groups of pixels from an image data signal IMAGE_DATA, provided from the image to be color corrected.

There are two methods of training the neural network, supervised and unsupervised. The exemplary embodiment of the present invention uses a combination of both supervised and unsupervised learning for training the pixel fuzzy classifier. First, a Kohonen Neural Network is trained using unsupervised learning to identify groups of pixels to be used to train a feed-forward neural network. The groups of pixels identified by the Kohonen Neural Network are applied to the feed-forward neural network 410a as example pixels and used for supervised training of pixel fuzzy classifier 410. As a result, the pixel change-class can be quickly and accurately trained with little or no user involvement.

In supervised learning, there is a training set that consists of a set of input and desired-output vector pairs. The vector pairs are typically used in an iterative process. First, the input vector is applied to the network which produces an output which is then compared to a desired output. Next, the weight values and bias of the node are adjusted to decrease this difference.

The iterative process is usually a form of gradient descent where the gradient of the error surface is estimated, and the weight values are adjusted based on the gradient so that the root-mean squared error is minimized. The root-mean squared error is the square root of the square of the difference between the actual result and the desired result. Back propagation and conjugate gradient as are well known in the art are two common examples of iterative processes that rely on gradient information. The conjugate gradient is explained below.

Figure 5:
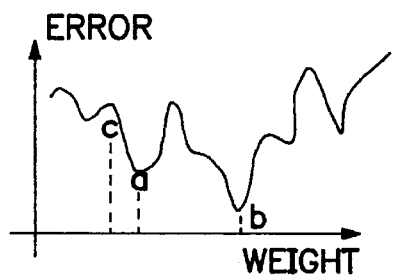
FIG. 5 is a graph of an error surface with only one weight.

When these methods are used, however, depending on the starting point, the algorithm may become stuck in a local minimum. To illustrate this, consider FIG. 5 which represents an error surface with only one weight. A gradient-based algorithm starting at point "c" would end up in a local minimum at point "a" which is greater than the global minimum at point "b". To avoid these local minima, a procedure is provided which does not make an assumption about the search space and, as a result, increases the probability that the minimum at point "b" can be reached. Two procedures can be used to avoid the local minima: (1) simulated annealing and (2) genetic optimization. These procedures are discussed below.

Unsupervised learning is normally used to discover unknown patterns in data. There are no desired outputs, only input data. Data is clustered or categorized in these networks. Similar inputs are classified in the same cluster causing the same output node to "fire."

The exemplary embodiment of the present invention uses both unsupervised and supervised learning to identify the pixel change-class.

After the change-class has been identified, the conjugate gradient search is used to slide the weight vector down the nearest slope. After the gradient technique appears to be at a minimum, simulated annealing is used to try to "bump" the weight vector out of a possible local minimum. If a substantial advantage is achieved by annealing, the algorithm repeats the conjugate gradient search until only trivial improvements are made or until a user set retry limit is reached.

The retry limit is chosen to minimize processing time and to achieve a desired improvement in the obtained weights. The weights are improved as the value of the retry limit is increased. As the retry limit is increased, however, the time required to train the neural network increases. Accordingly, the user balances improvement of the weights against time for training. In the exemplary embodiment of the present the retry limit is five.

FIG. 6 is a flow chart of the training algorithm for training the feed-forward neural network in fuzzy neural classifier 410. The training method includes three processes: genetic optimization, conjugate gradient search, and simulated annealing. These processes are well known to one of ordinary skill in the art of neural network design as illustrated in *Practical Neural Network Recipes in* C++, by Timothy Masters, San Diego, Academic Press, Inc. (1993), which is incorporated herein by reference for its teachings on the training of neural networks.

First, at step 510, example pixels are provided to the neural network 410a by the user or the Kohonen Neural Network. The example pixels include pixels in the change-class as well as pixels in the do-nothing class. To ensure proper training, one third to one half of the total number of example pixels should be pixels in the change-class. If enough pixels in the change-class are not identified, additional change-class pixels are generated from the existing change-class examples by, for example, duplication.

Pixels are provided in each class so the feed-forward neural network can be trained to determine the difference between the change-class and the do-nothing class and produce fuzzy membership value c of a pixel in the change-class. Generation of example pixels by the Kohonen Neural Network is described below.

Then, at step 520, a genetic structure representing the parameters of the optimization problem is chosen. For the exemplary embodiment of the present invention, the genetic structure are the weights of the neural network. Genetic optimization is used to initialize the neural network weights to obtain an initial weight vector which is closer to a global minimum than would result from random weight initialization.

Initialization is performed by randomly generating a population of weight sets having weight values for the different nodes of the neural network. Ideally the weight values of the weight sets are relatively small random values which are assigned to the different nodes. These initial values represent a starting point in the search for the best set of initial weight values which will produce the correct membership of a pixel in the change-class. Each individual weight set in the population is tested using an objective function to compute a fitness value which is a measure of the optimization of an objective function by the weight set. The objective function used in the exemplary embodiment of the invention is the root-mean squared error.

Example pixels are applied to the neural network for each weight set generated to produce a parent fuzzy membership value for each weight set. The "difference of the actual result and the desired result" in the root-mean squared error is the difference between the parent fuzzy membership value and the fuzzy membership value determined according to relation (8), for example, below:

$$\text{If } PX\{R,G,B\}=PX'\{R',G',B'\} \text{ then } c=1 \text{ else } c=0 \quad (8)$$

where $PX\{R,G,B\}$ is the input example pixel having pixel data values R, G, and B, $PX'\{R',G',B'\}$ is a pixel in the change-class, and c is the membership value. For example, an input pixel $PX\{R,G,B\}$ having pixel data values R, G, and B is or is not a member, i.e.—having one hundred percent or zero percent membership, in the change-class defined by pixels $PX'\{R',G',B'\}$ having pixel data values R', G', and B' according to relation (8).

Then the weight sets which produce the greatest optimization of the objective function (i.e., the smallest difference value), "parent weight sets", are selected and used to generate new weight sets, "children weight sets". For example, ten weight sets can be randomly generated. Four of the ten weights which generate the lowest root-mean squared error, i.e.—optimize the objective function, are selected as parent sets to generate children sets. A child weight set can be generated by, for example, averaging the corresponding weights in each of the four parent sets. Alternatively, the weights can be generated by copying a portion of the weights from one parent weight set to a second parent weight set. For example, if the parent weight sets have 10 weight values, one weight value for each node in the neural network, the first five weight values of the first parent weight set can be combined with the last five weight values of the second parent weight set to produce a child weight set.

In addition to combining parent weight sets to produce children weight sets, mutation can be introduced. For example, a random number can be substituted for one of the weights in the child weight set to introduce a mutation in the generation of the child weight set. The above-referenced book by Masters teaches the generation and selection of parents and the reproduction of children in neural network training.

At step 530, the conjugate gradient process modifies the weight values of a child weight set generated at step 520 to move the weight values towards the global minimum by applying the example pixels obtained at step 510 to neural network 410a. Then, the conjugate gradient process uses information about the gradient of the error surface to update the weight values in an iterative process. Each step of the iterative process does not undo any error reduction of the previous steps because the direction of the current step is conjugate to the previous steps.

After the example pixel values have been applied, they are propagated through the neural network to produce a fuzzy membership value c. Then the root-mean square of the difference between the desired output determined according to relation (8) and the actual fuzzy membership value c is used to calculate an error value.

Next, a second weight set is applied to the neural network 410a to produce a second pixel fuzzy membership value. A conjugate gradient algorithm as is well known to those skilled in neural network design, for example the Polak-Ribiere algorithm, is applied to determine the search direction to avoid selecting the wrong search direction when the subsequent error value is generated. The search direction is selected to minimize the root-mean square error. The root-mean square error is then determined for this value. This process is repeated until the root-mean error produced for a corresponding weight set does not decrease.

For example, as shown in FIG. 6a, a first weight set is used to produce error value 610, a second weight set is used to produce error value 620, a third weight set is used to produce error value 630, and a fourth weight set is used to produce error value 640. Error value 640 has not decreased from the previous error value 630. Accordingly, a minimum exists between error value 620 and 640. Next, an error value 650 is generated between error values 630 and 640 using a fifth weight set. Since error value 650 is less than error value 640 but greater than error value 630, error value 640 is discarded. The minimum is between error values 620 and 650. This process is repeated to obtain error value 660 which is a minimum corresponding to a sixth weight set.

Next, simulated annealing is performed at step 540 on the weight set which produced the minimum error value, for example, the sixth weight set. Simulated annealing is performed by (1) randomly perturbing the weight values in the neural network, and (2) tracking the lowest error value produced by perturbing the weight values. The weight values are perturbed using a random number generator having a relatively low standard deviation.

At step 550 it is determined in the simulated annealing produced improved weight values. If the weight values are improved, it is then determined at step 560 if the improvement is trivial. If the improvement is not trivial, then step 530 is repeated to perform the conjugate gradient for the weight values generated at step 540. After many tries, the set of weight values that produce the best function value, i.e.—the weight values which minimize the root-mean squared error, are designated to be the center about which perturbation will take place for the next desired state. The standard deviation of the random number generator for the next desired state is then reduced, and simulated annealing is performed again. If the improvement is trivial as determined at step 560 or if the weight values are not improved at step 550, step 570 is performed.

At step 570 it is determined whether a specified number of trials has been reached, for example, five. If so, the training method is terminated. If, however, the trial limit has not been reached, then at step 580 the weights are set at the state prior to the start of the conjugate gradient step 530. Then step 530 is repeated. The trial limit can be set by the user. The weights from the above process which produce the lowest root-mean squared error are selected as the weights for the neural network to classify the fuzzy membership c of pixels in the change-class.

Figure 7:
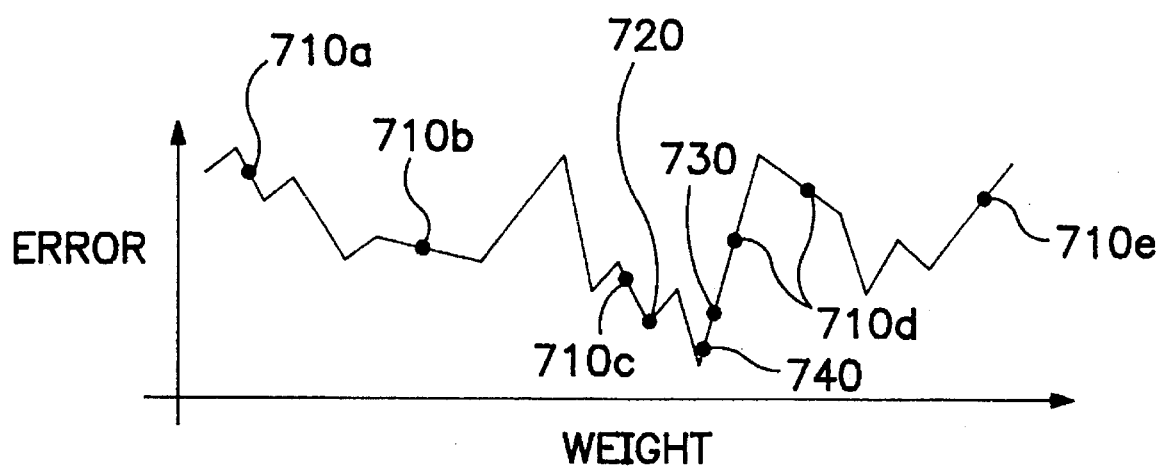
FIG. 7 is a graph illustrating the use of the training method in FIG. 6.

FIG. 7 illustrates how the training method in FIG. 6 can proceed. At step 520, weight values 710a–710e are identified and weight value 710c at the lowest minimum is selected as the initial weight value for step 530. At step 530, local minimum 720 is identified. Then simulated annealing is performed at step 540 which breaks out of the local minimum to weight value 730. Then, conjugate gradient step 530 is then performed again to find the next local minimum 740. In this case the local minimum and the global minimum are the same.

Figure 8:
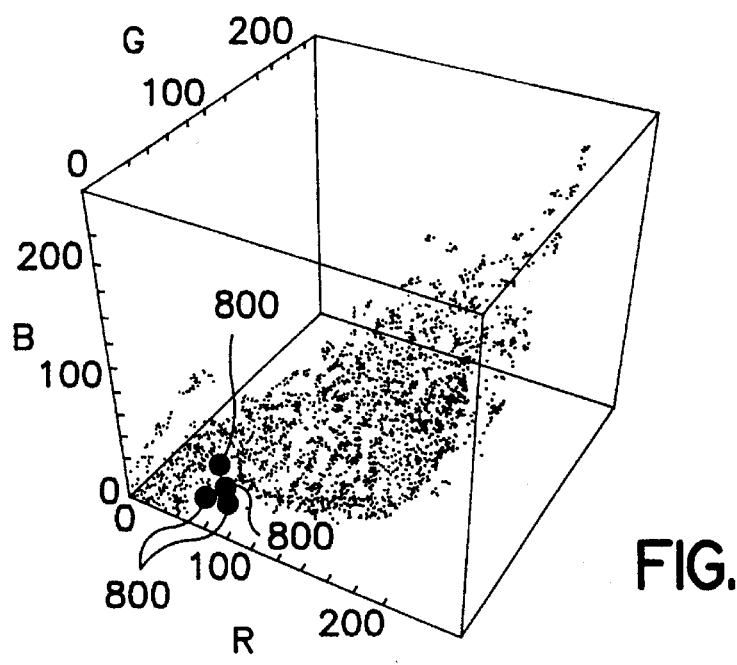
FIG. 8 is a 3-dimensional plot of the location of an image in an Red-Green-Blue (RGB) cube.

Identification of the example pixels used in the training method illustrated in FIG. 6 for fuzzy classifier is explained below with reference to FIGS. 8–12. FIG. 8 is a three-dimensional plot of the color composition of an image in an RGB cube. Only the luminance component of the image is shown in the figures. The pixels in the change-class are identified by the darker dots 800.

Example pixels in the class or classes of colors to be changed, the change-class, are provided to the fuzzy neural classifier 410 by pixel group classifier 400 or interface device 405. The neural classifier 410 is also provided the direction in which the pixels should be changed using interface device 405. Table 1 shows a list of example pixels and the vector to change the pixels. In Table 1 {rll,gll,bll} is an example pixel including red r, green g, and blue b components and {rvl,gvl,bvl} is a vector specifying the amount each individual component is to be changed. Thus, pixel the {rll,gll,bll} is to be change to {(rll+rv1), (gll+gv1), (bll+bv1)}.

TABLE 1

Change-classes and change direction.

| Class Number | Examples | Change Vector |
| --- | --- | --- |
| 1 | {r11, g11, b11} | {rv1, gv1, bv1} |
| ... | | |
| 2 | {r1n, g1n, b1n}<br>{r21, g21, b21}<br>{r22, g22, b22} | {rv2, gv2, bv2} |
| ... | | |
| 3 | {r31, g31, b31} | {rv3, gv3, bv3} |

In addition, examples of pixels not belonging to the change-class are also provided to the fuzzy neural classifier from pixel group classifier 400 or interface device 405. The pixels not in the change class are called the do-nothing class. One third to one half of the example pixels provided to the neural network for training should be in the change-class. If there are not enough pixels in the change class to satisfy the above quantity, the system can include a system for duplicating the pixels in the change-class so that an adequate number of pixels can be provided to the neural network for training.

Figure 9:
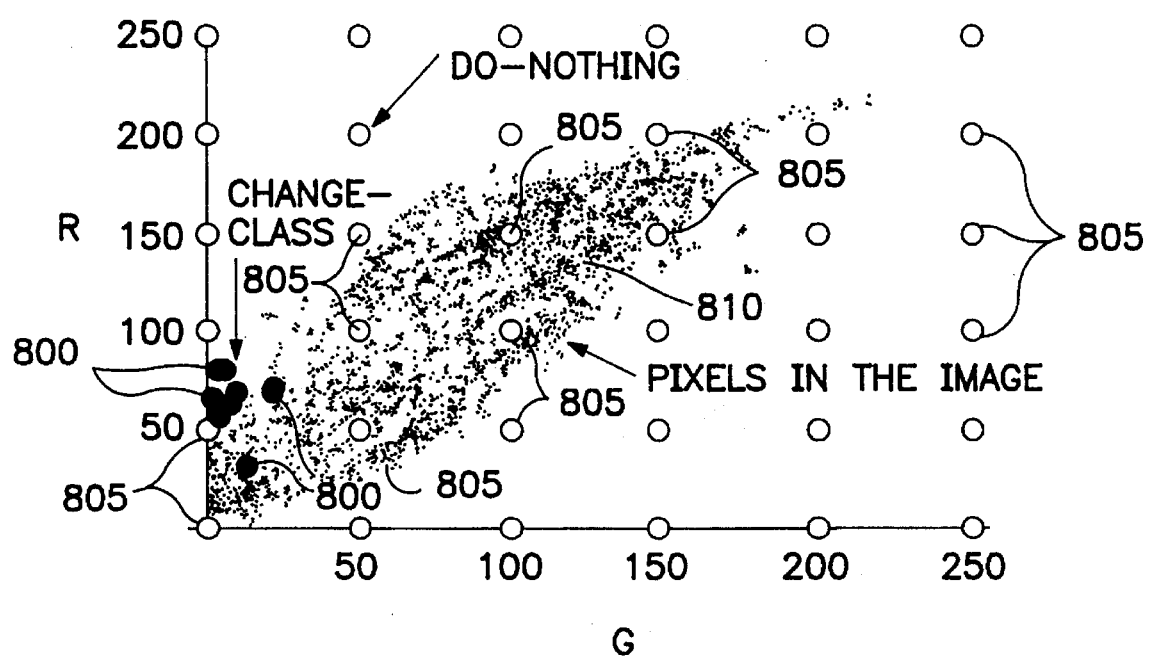
FIG. 9 is a two-dimensional graph of the change-class examples and the do-nothing class examples of the imager in FIG. 8 projected onto an Red-Green (RG) plane.

First, the do-nothing class is represented as a arbitrary sampling of all colors in an RGB cube which are sampled linearly in each dimension. For clarity, the change-class examples and the do-nothing class examples are projected onto an RG plane as illustrated in FIG. 9. The do-nothing examples are represented by large open dots 805, the change-class examples are represented by large black dots 800, and the image pixels as small dots 810. A grid of do-nothing examples is used and examples of specifically what not to include are not provided to the pixel fuzzy classifier. The example pixels in FIG. 9 have been provided to the fuzzy pixel classifier 410 through interface device 405.

Pixels in the change-class near the arbitrarily chosen pixels in the do-nothing-class may be incorrectly included in the do-nothing class. This problem can be avoided by creating a preponderance of pixels in the change-class, so that the root-mean squared error favors the chosen pixels in the change-class. The distinction between the change-class and the do-nothing class is improved by finding clusters of points in the original image and using those points as examples of the do-nothing class.

Figure 10:
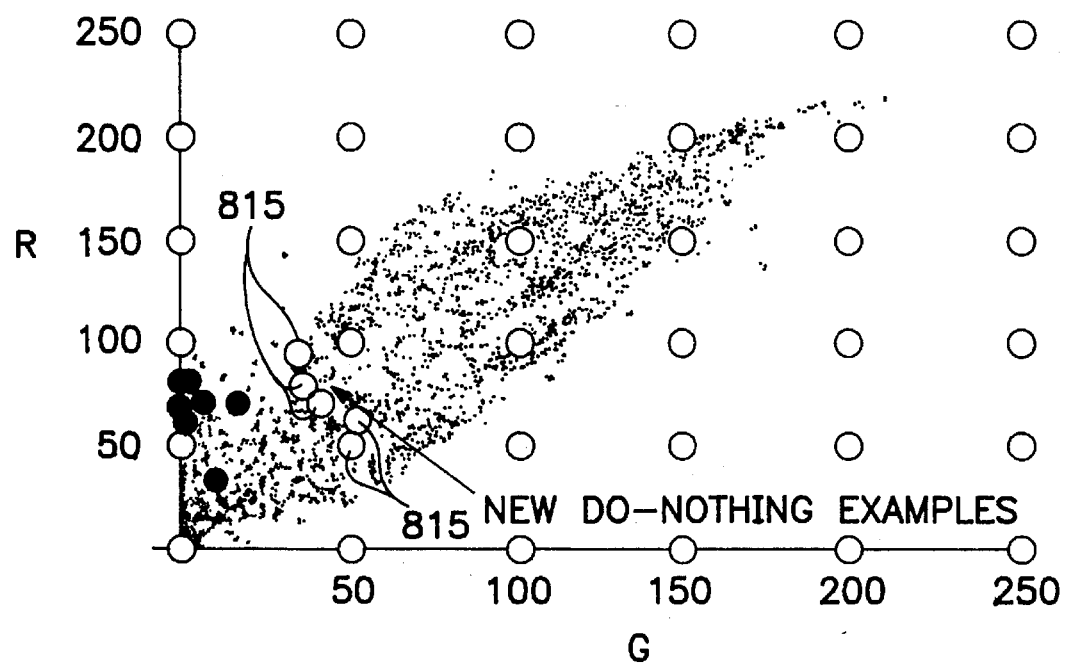
FIG. 10 is another two-dimensional graph of the change-class examples and additional do-nothing class examples of the image in FIG. 8 projected onto an RG plane.

The new do-nothing examples 815 shown in FIG. 10 are used to improve the fuzzy membership of the pixels in the do-nothing class and the change-class. The do-nothing and the change-class pixels from FIG. 10 are used at step 520, shown in FIG. 6, to initialize the weights of the neural network.

Figure 13:
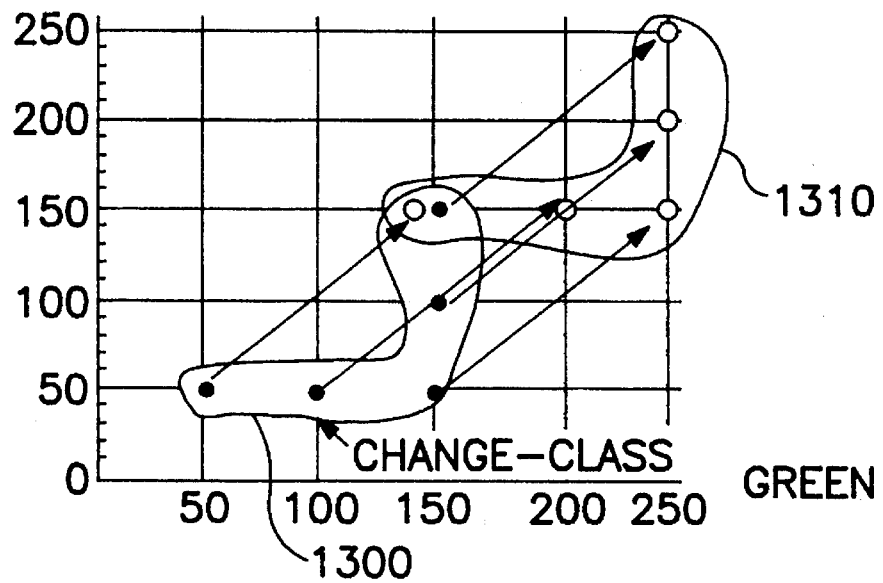
FIG. 13 is a graph showing the projection of the location of each pixel in an image onto a two-dimensional color plane.

FIGS. 13 illustrates another example of changing pixels in a change-class using the exemplary embodiment of the present invention.

FIG. 13 is a plot showing the projection of the location of each pixel in an image onto a two-dimensional plane. The examples in the training set for each red-green pair is repeated to cover the blue dimension. The training set in the change-class 1300 is shown as solid dots. For the point shown at (50,50) the training set actually included the points (50,50,50), (50,50,150) and (50,50,250).

Figure 14:
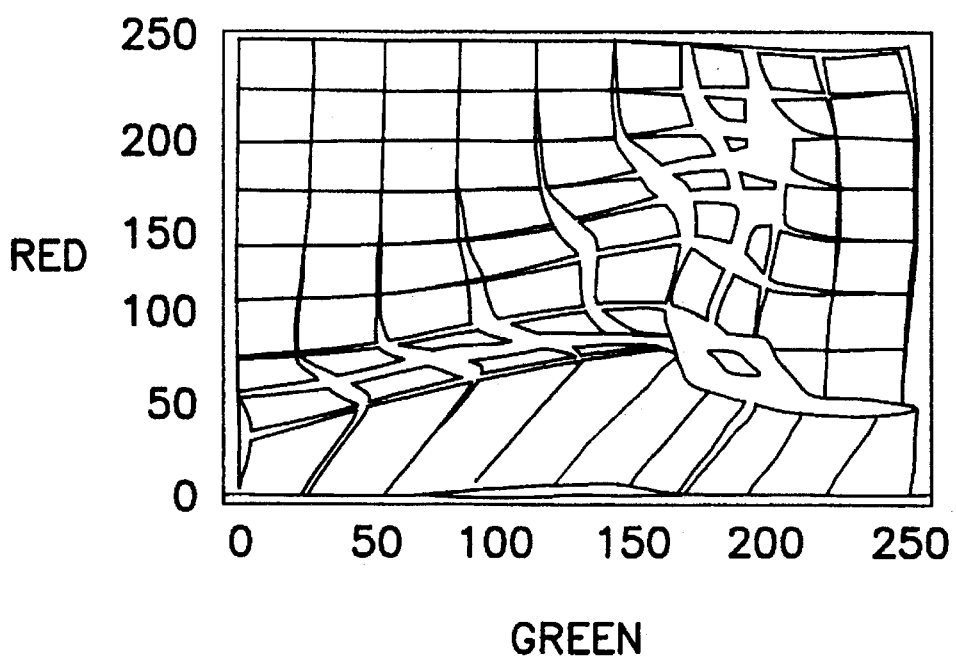
FIG. 14 is a plot showing the projection of the location of each pixel in the image shown in FIG. 13 onto a two-dimensional color plane where the image has been color corrected using a color corrector according to the exemplary embodiment of the present invention.

The feed-forward neural network has a 3-4-1 architecture having three inputs for receiving the pixel data values R, G, and B, four nodes, and one fuzzy membership value c1. This the same neural network shown in FIG. 4b without the additional node for fuzzy membership value c2. Only one fuzzy membership value c1 is used since there is only one change class. The fuzzy neural classifier was trained and executed on an image that sampled the Red-Green-Blue cube at 10 equally spaced points along each dimension, yielding 1000 remapped points. The projection of these points onto the Red-Green plane is shown in FIG. 14 with the points connected in a grid to emphasize the remapping. The deviation of an intersection from a rectangular grid point is the extent of color correction at that point.

The fuzzy neural classifier 410 changed pixels in or near the change-class in the proper direction. For example, the pixels in the upper left-hand corner of the Red-Green plane were left unchanged. The fuzzy classifier network 410 computed the fuzzy membership value for the pixels, leaving the actual remapping to the pixel changer.

Alternatively, a Kohonen Neural Network using unsupervised training can be used to find clusters in the color space of the image to provide do-nothing examples to train the feed-forward neural network 410a. The image data values R, G, and B of the clusters are provided to the feed-forward neural network 410a as example pixels. The clusters generated by the Kohonen Neural Network also include a cluster corresponding to the change-class of the neural network.

In the exemplary embodiment of the present invention the cluster corresponding to the change-class is also provided to the neural as a do-nothing example. This may introduce a minor error in weight values produced when training the neural network. This error can be ignored when the number of clusters identified by the neural network is much greater than one, for example, fifty. Alternatively, the cluster corresponding to the change-class can be identified by comparing the clusters to the change-class pixels and not providing the identified cluster as a do-nothing example to the feed-forward neural network for training.

Figure 11:
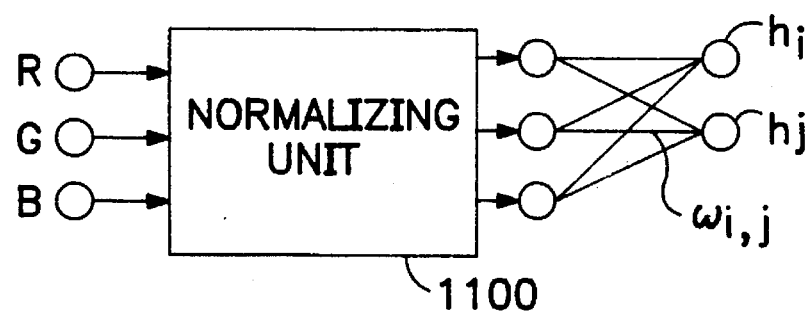
FIG. 11 is a block diagram of a Kohonen network in the pixel group classifier 400 shown in FIG. 3.

The Kohonen Neural Network shown in FIG. 11 is an example of an unsupervised learning network which is included in the pixel group classifier 400. A Kohonen Neural Network is capable of finding patterns of m multi-dimensional data. Accordingly, clusters of pixels in the RGB color space of an image can be identified. The image under consideration is the training set for the Kohonen Neural Network. Once the network is trained, the weights to the output nodes are the locations of the clusters.

The Kohonen Neural Network operates on the principal of competitive learning, where output neurons "compete" to win. During training, only one, or sometimes a few neurons "win" the right to have their weights updated. The exemplary Kohonen Neural Network is provided image pixels comprising one or more pixel data values R, B, and G for the three primary colors red, blue, and green from the image. The pixel data values R, G, and B are first normalized in normalizing unit 1100. Next pixel data values R, G, and B are multiplied by a weight $w_{ij}$ to produce an output data value $h_i$. The output data value, $h_i$ of each unit in the Kohonen Neural Network, is determined by equation (5) below:

$$h_i = \Sigma w_{ij} * I_j \qquad (5)$$

where $w_{ij}$ is the weight from the jth input to the ith output node and $I_j$ is the jth input which is one of the pixel data values R, G, and B. The winner is the node with the greatest data value output $h_i$. The winning node has its weight updated according to equation (6) below:

$$\Delta w_{ij} = \alpha(I_j - w_{ij}) \qquad (6)$$

where $\Delta w_{ij}$ is the amount the weight from the jth input to the ith output node, the node with the greatest output, is changed and $\alpha$ is a fixed constant used to update the weights. $\alpha$ is the learning rate of the network. The result of equation (6) is used to move the weights of the winning data value output $h_i$ closer to the input pixel data values R, G, and B by adding the value of $\Delta w_{ij}$ to the value of the weight of the jth input to the ith output node. When training is completed, the weights themselves represent the locations of the clusters.

Although pixel group classifier 400 is shown in FIG. 3 as part of the non-linear color corrector, pixel group classifier 400 need not be included in the color correction system. Pixel group classifier 400 can operate independently of the non-linear color corrector.

Referring to FIG. 3, after the Kohonen Neural Network is trained, pixel group classifier 400 provides the weights from the Kohonen Neural Network to the neural network classifier, which uses the weights as pixel data values to train feed-forward neural network 410*a*.

Figure 12:
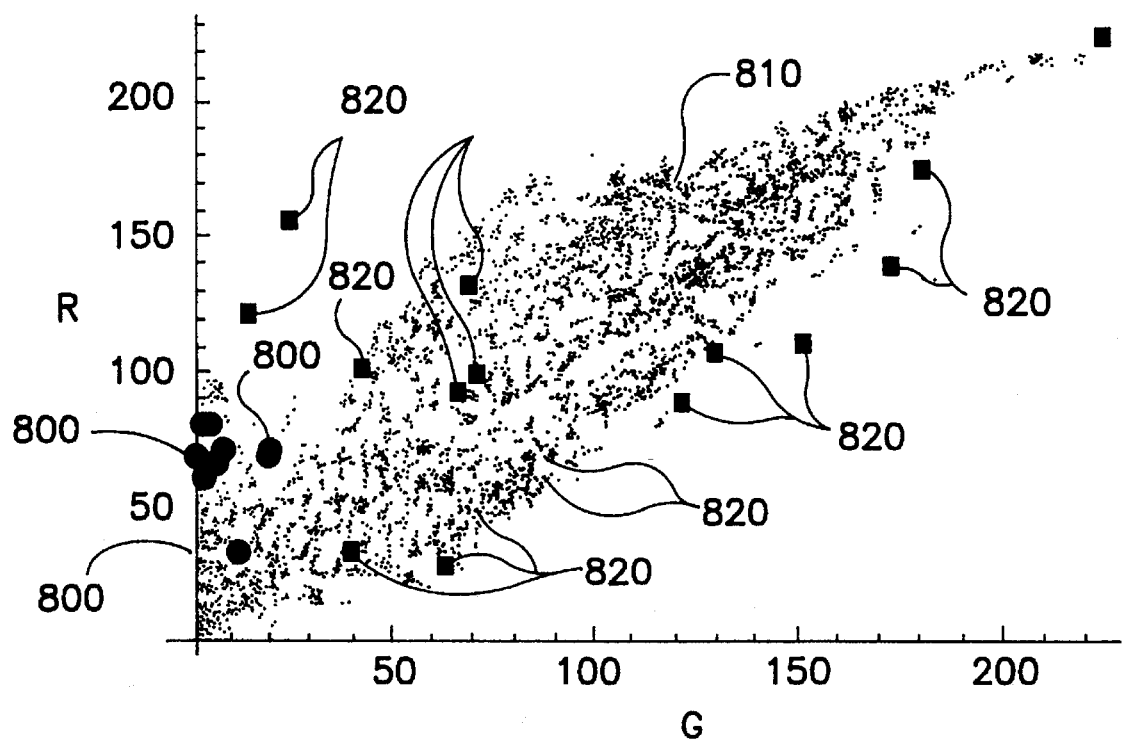
FIG. 12 is two-dimensional graph of change-class examples and do-nothing class examples generated by a Kohonen network of the image in FIG. 8 projected onto an RG plane.

FIG. 12 illustrates example pixels to be provided to the fuzzy neural classifier for training. The change-class examples are illustrated by dark spots 800, the Kohonen Neural Network located clusters are illustrated by squares 820, and the pixels by smaller dots 810. The number of examples in the do-nothing class where reduced by using the Kohonen Neural Network to identify the cluster of pixels.

In another exemplary embodiment of the present invention pixel fuzzy classifier 410 and pixel color changer 420 can be combined. In this exemplary embodiment the neural network classifies pixels and remaps the pixels using a neural network.

Figure 15:
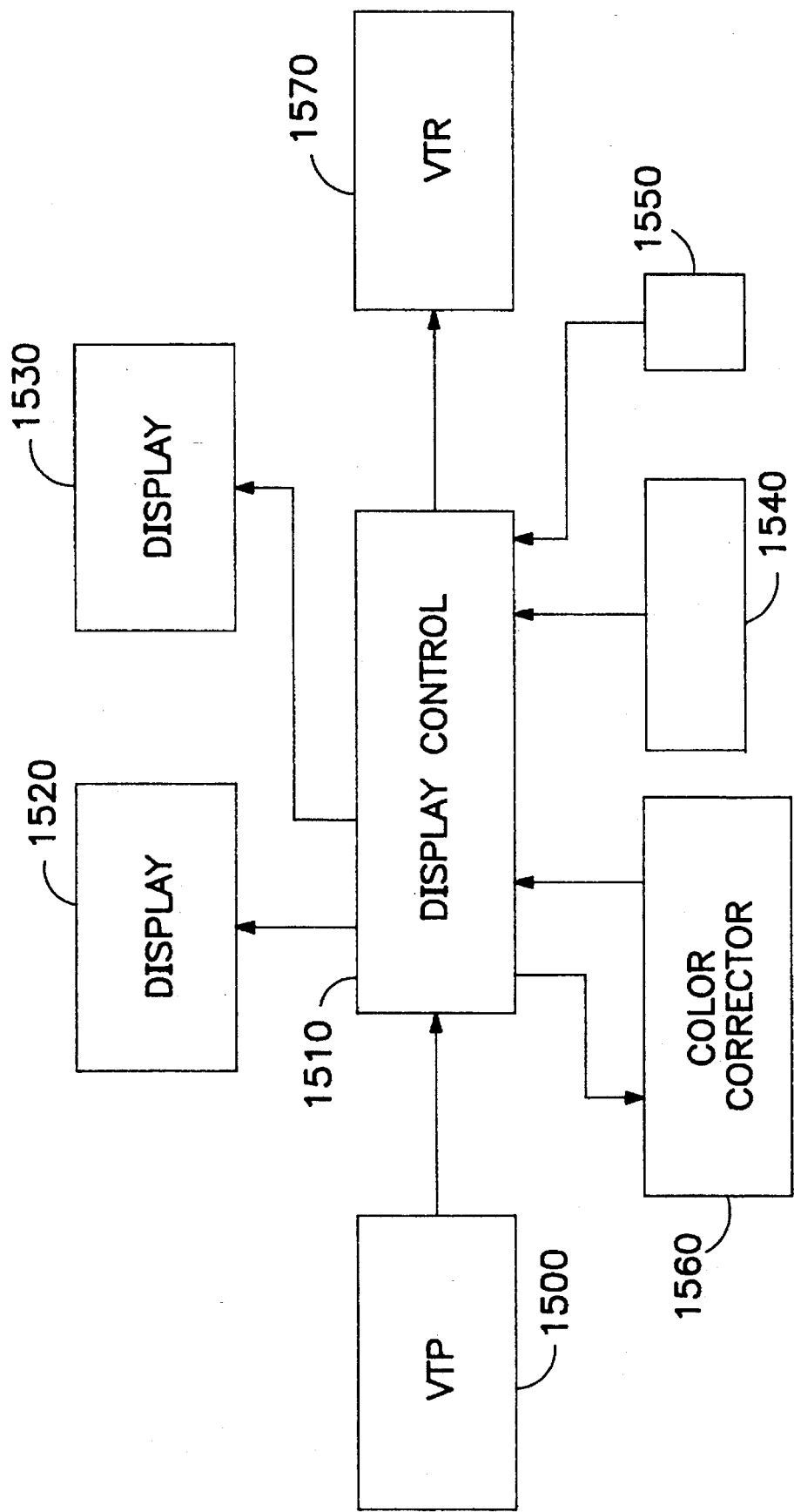
FIG. 15 is a block diagram of a color correction system according to an exemplary embodiment of the present invention.

FIG. 15 is another exemplary embodiment of the present invention. FIG. 15 is a color corrector system for correcting the color of a video image provide by a video tape player (VTP) 1500. The video from VTP 1500 is, for example, a film that has been transferred to video. When film is transferred to video tape, the colors which look suitable when projected from the film onto a screen are not necessarily suitable for display on a video screen from a video tape. Accordingly, it is necessary to color correct scenes in the film which have been transferred to video tape so that the picture produced from the film is suitable for display on a video screen.

VTP 1500 provides a video signal from a video tape to display control unit 1510. Display control unit 1510 displays an image on displays 1520 and 1530 corresponding to the video signal. The displayed image would be, for example, one scene. A scene may last only for a few moments or for a longer duration. The user first color corrects a frame of the scene as displayed. Once that frame has been corrected to the user's satisfaction, the entire scene is color corrected.

First, the user after reviewing the displayed image frame identifies pixels in the image to be changed using keyboard 1540 and mouse 1550. In addition, the user would specify the color the change-class pixels are to be changed. For example, the user could identify light red pixels to be changed to dark red pixels. The system would then determine the appropriate values for $\Delta R$, $\Delta G$, and $\Delta B$ used by the color changer. Then these values are provided to the color corrector 1560 which is the color corrector shown in FIG. 3.

The user selects several pixels in the change-class by pointing with the mouse and marking the pixels to be changed. In addition, the user may identify pixels in the do-nothing class. The change-class examples and the do-nothing examples are then provided to the color corrector which uses the examples to train the neural network. As noted above, the user can identify pixels in the do-nothing class or the Kohonen Neural Network can produce the do-nothing examples. In the color corrector system shown in FIG. 15, the color corrector includes a Kohonen network for generating examples of pixels in the do-nothing class. Once the feed-forward neural network in the color corrector 1560 has been trained with the example pixels provided by the user and the Kohonen Neural Network, the display control unit 1510 provides the pixels from the scene to be color corrected to color corrector 1560. Color corrector 1560 calculates the fuzzy membership value c for each pixel in the scene and changes the pixel according to the pixels membership in the change-class and the color to which the change-class is to be changed.

The color corrected pixels are provided to the display control unit 1510 and displayed on display 1530. The user can examine the difference between the corrected image displayed on display 1530 and the original image displayed on display 1520. If the change is not acceptable, the user can change the change-class by identifying new pixels in the original image or change the color to which the change-class is to be changed. If a new change-class is identified, display control unit 1510 provides the new change-class to color corrector 1560 to retrain the neural network. Then the pixels in the scene are color corrected. Alternatively, if the color is only changed, the pixels in the scene are provided to the color corrector which changes the pixels in the original change class according to the new color specified by the user.

Once the user is satisfied with the changes to the image frame, the entire scene is color corrected by providing the image signal to display control unit 1510 which provides the image signal to color corrector 1560. Color corrector classifies the pixels in the image and color corrects the pixels in the image using the membership value of the pixels in the change-class. The color corrected pixels are provided to display control unit 1510 which provides the color corrected scenes to video tape recorder (VTR) 1570 which records the color corrected video.

Although illustrated and described herein with reference to certain specific embodiments, the present invention is nevertheless not intended to be limited to the details shown.

Rather, various modifications may be made in the details within the scope and range of equivalents of the claims and without departing from the spirit of the invention.

What is claimed:

1. A color corrector for transforming an image having pixels representing different color values in the image, said color corrector comprising:

means for identifying a grouping of pixels in the image to be transformed from a first group of color values towards a second color value;

neural fuzzy classifier means for only generating a membership data value for a pixel in the image defining a degree of membership of the pixel in the grouping of pixels, the neural fuzzy classifier means comprising a first neural network; and transforming means for transforming the pixel by a specified amount in response to the membership data value toward the second color value where the transforming means is not a neural network.

2. The color corrector recited in claim 1, further including means for training the neural fuzzy classifier to generate the membership value, the training means including pixel classifier means for identifying pixel groups of related pixels in the image and means for generating weight data values in response to the pixel groups, said weight data values provided to the neural fuzzy classifier, the pixel fuzzy classifier means comprising a second neural network.

3. The color corrector recited in claim 2, wherein the image has do-nothing pixels not to be transformed and one of the weight data values represents a location of a do-nothing group of the do-nothing pixels in the image.

4. The color corrector recited in claim 2, wherein the pixel classifier means comprises a Kohonen Neural Network.

5. The color corrector recited in claim 1, wherein the neural fuzzy classifier comprises a feed-forward neural network.

6. A color corrector for transforming an image having pixels representing different color values in the image, said color corrector comprising:

means for identifying a grouping of pixels in the image to be transformed from a first grouping of color values towards a second color value and generating a change-class signal and a color change signal;

a fuzzy neural classifier coupled to the identifying means to receive the change-class signal, said fuzzy neural classifier only generating fuzzy membership signals, the neural fuzzy classifier means comprising a first neural network; and a color corrector coupled to the neural classifier to receive the fuzzy membership signals and coupled to the identifying means to receive the color change signal, the color corrector for transforming the grouping of pixels by a specified amount towards the second color value where the color corrector is not a neural network.

7. The color corrector recited in claim 6, further including a pixel group classifier coupled to the fuzzy neural classifier to provide an example pixel signal, the pixel group classifier comprising a second neural network.

8. The color corrector recited in claim 7, wherein the pixel group classifier is a Kohonen Neural Network.

9. The color corrector recited in claim 6, wherein the fuzzy neural classifier is a feed-forward neural network.

10. The color corrector recited in claim 7, wherein the pixel group classifier identifies example pixel groups of the pixels in the image and wherein the example pixel groups are used to train the fuzzy neural classifier to produce the fuzzy membership signal specifying an amount to change a pixel in the image.

11. A method for transforming an image having pixels representing different color values in the image, said method comprising the steps of:

(1) identifying pixel groups of related pixels in the image using a first neural network applying unsupervised training;

(2) identifying a grouping of pixels in the image to be transformed from a first grouping of color values towards a second color value;

(3) generating, in response to the identified groups of related pixels, a membership data value for a pixel in the image defining a degree of membership of the pixel in the grouping of pixels using a second neural network applying supervised training; and (4) transforming the pixel by a specified amount in response to the membership data value toward the second color value.

12. The method recited in claim 11, further including the step of identifying pixel groups of related pixels in the image, and wherein step (3) further includes generating the membership data in response to the grouping of pixels and the pixel to determine the degree of membership of the pixel in the grouping of pixels to be transformed.

13. A method for transforming an image having pixels representing different color values in the image, said method comprising the steps of:

(1) identifying a grouping of pixels in the image to be transformed from a first grouping of color values towards a second color value;

(2) generating a membership data value for a pixel in the image defining a degree of membership of the pixel in the grouping of pixels using a neural network; and (3) transforming the pixel by a specified amount in response to the membership data value toward the second color value not using a neural network.

\* \* \* \* \*